United States Patent
Lin

(10) Patent No.: US 6,561,708 B2
(45) Date of Patent: May 13, 2003

(54) MOVABLE CLAMPING DEVICE FOR FOLDABLE KEYBOARD

(75) Inventor: Winky Lin, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/897,485

(22) Filed: Jul. 3, 2001

(65) Prior Publication Data

US 2003/0007822 A1 Jan. 9, 2003

(51) Int. Cl.[7] .............. B41J 5/08; B41J 5/10; G09G 5/00; A47F 7/14; H01R 3/00
(52) U.S. Cl. ............ 400/495; 400/489; 345/168; 248/900; 364/208.1; 439/165; 361/686
(58) Field of Search ............... 400/489, 495; 361/686; 345/168; 235/145; 248/918; 364/708.1, 208.1; 439/165

(56) References Cited

U.S. PATENT DOCUMENTS 4,949,933 A * 8/1990 Stone ................ 248/442.2
5,158,256 A * 10/1992 Gross ................ 248/118.3
5,187,468 A * 2/1993 Garthwaite et al. ......... 340/709
5,253,836 A * 10/1993 Tso ................ 248/231.4
5,470,040 A * 11/1995 Bhagat et al. ........... 248/222.4
6,108,200 A * 8/2000 Fullerton ................ 361/686

* cited by examiner

Primary Examiner—Andrew H. Hirshfeld
Assistant Examiner—Marvin P Crenshaw
(74) Attorney, Agent, or Firm—Rabin & Berdo, P.C.

(57) ABSTRACT

A foldable keyboard includes a clamping stage, and a retaining stage. The foldable keyboard has an accommodation region on rear edge thereof. A strip-shaped rail is formed in front of the accommodation region and a guiding groove is formed on an opposite side of the accommodation region. The clamping stage is laterally movable on the accommodation region. The clamping stage has a pair of bumps on a rear side thereof and each bump has a pivotal hole on an inner side thereof such that the clamping stage can be pivotally connected to the retaining stage. The retaining stage has a socket electrically connected to an internal circuit of the foldable keyboard and a portable electronic device can be inserted into the socket.

9 Claims, 5 Drawing Sheets

MOVABLE CLAMPING DEVICE FOR FOLDABLE KEYBOARD

FIELD OF THE INVENTION

The present invention relates to a foldable keyboard, especially to a movable clamping device for the foldable keyboard with easy operation.

BACKGROUND OF THE INVENTION

The prior art foldable keyboard generally includes a keyboard unit composed of rows of key-switches, a frame member enclosing the keyboard unit and a bottom plate. The prior art foldable keyboard generally is not provided with clamping device. For example, the foldable keyboards disclosed in U.S. Pat. No. 5,653,543 and WO0060438 should be placed on a flat surface such as a desktop to fully support the foldable keyboard. Otherwise, the foldable keyboard will bend upward or downward and cannot be operated easily.

SUMMARY OF THE INVENTION

It is the object of the present invention to provide a movable clamping device for a foldable keyboard with easy operation.

In one aspect of the invention, the movable clamping device comprises a clamping stage assembled to a foldable keyboard. The foldable keyboard has a rear edge defining an accommodation region, a strip-shaped rail in front of the accommodation region and a guiding groove on an opposite side of the accommodation region. Moreover, the clamping stage is laterally movable in the accommodation region.

In another aspect of the invention, the clamping stage pivotally connected to a retaining stage. The retaining stage has a socket electrically connected to the internal circuit of the keyboard and a portable electronic device can be inserted into the socket.

The various objects and advantages of the present invention will be more readily understood from the following detailed description when read in conjunction with the appended drawing, in which:

DETAILED DESCRIPTION OF THE INVENTION

Figure 1:
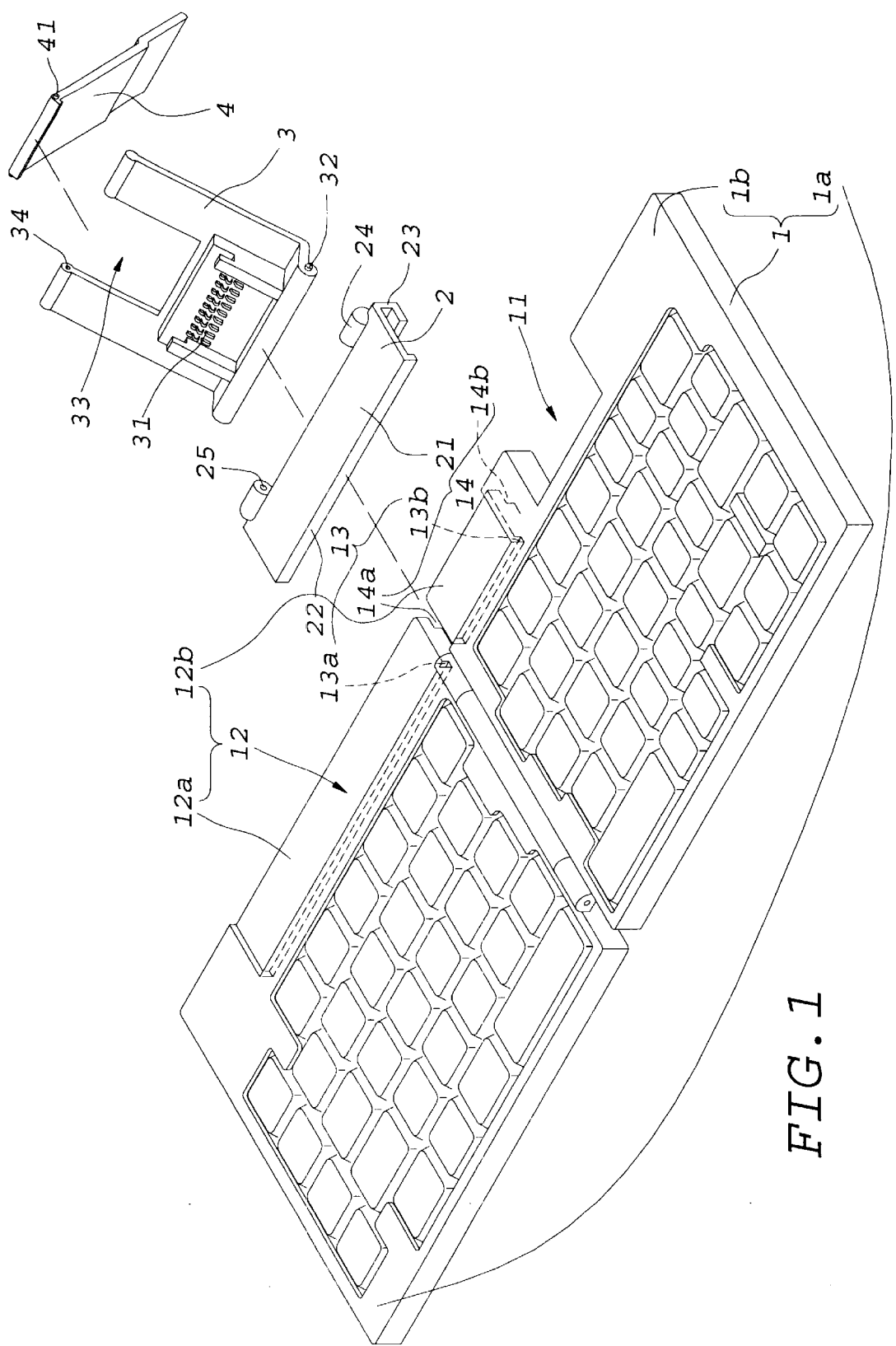
FIG. 1 shows an exploded view of the present invention.
Figure 2A:
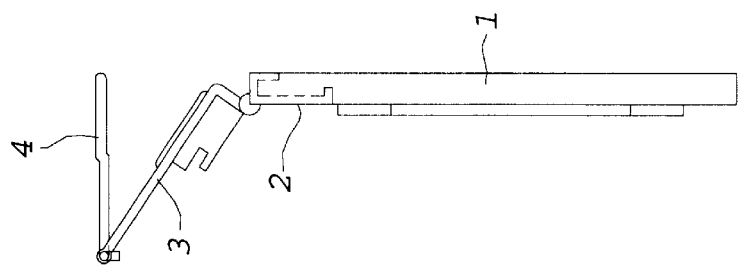
FIG. 2A shows a sectional view of the keyboard in unfolded state in the present invention.
Figure 2:
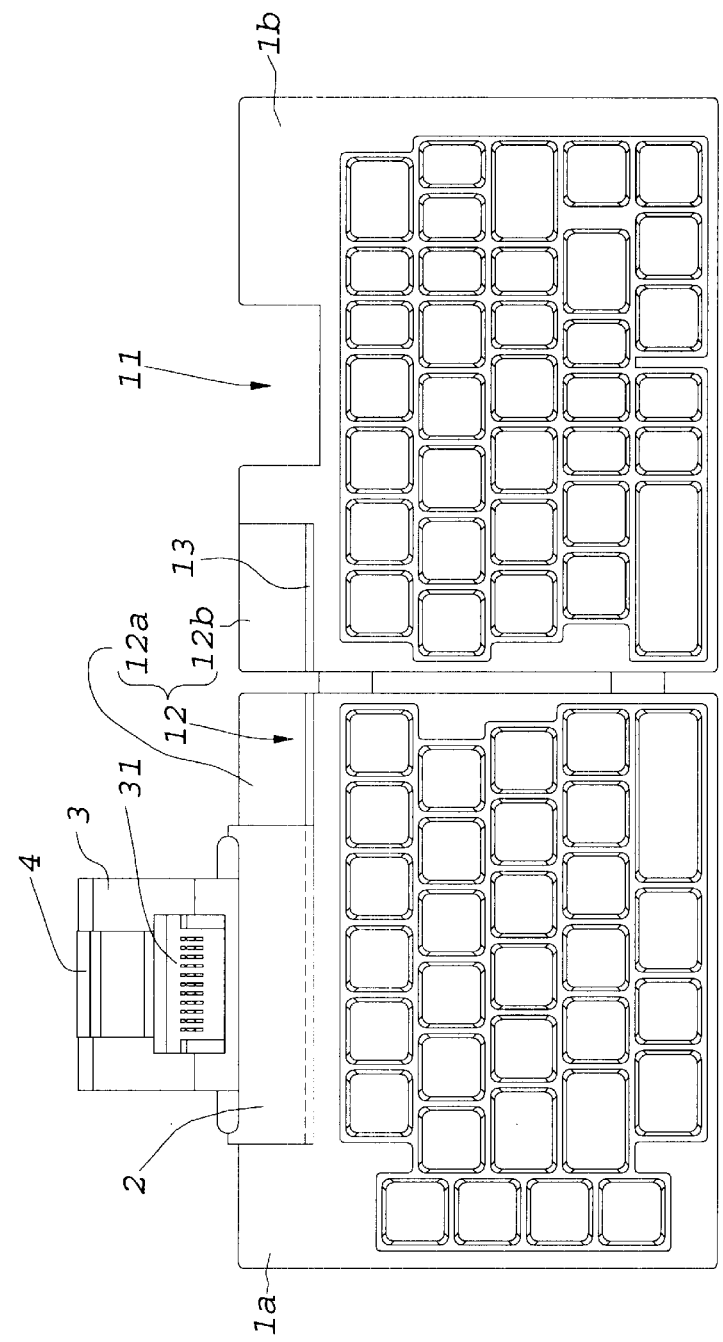
FIG. 2 shows a top view of the keyboard in unfolded state in the present invention.

With reference now to FIGS. 1 to 2A, the present invention provides a movable clamping device for foldable keyboard and the preferred embodiment of the present invention comprises a clamping stage 2 assembled to a keyboard 1 and being able to shift laterally with respect to said keyboard 1. Moreover, the clamping stage 2 appropriately connected to a retaining stage 3 and a supporting plate 4.

The keyboard 1 including a first keyboard portion 1a and a second keyboard portion 1b is foldable as the second keyboard portion 1a is pivotably connected to the first keyboard portion 1b. First keyboard portion 1a has a front edge and a rear edge, and a first locating region 12a formed at the rear edge. Similarly, second keyboard portion 1b has a front edge and a rear edge, and a second locating region 12b formed at the rear edge. There is an opening 11 adjacent to second locating region 12b on a rear edge of second keyboard portion 1b. First keyboard portion 1a further has a first rail 13a on the top surface of first locating region 12a, and a first groove 14a on the bottom surface of first locating region 12a. Similarly, second keyboard portion 1b further has a second rail 13b on a top surface of second locating region 12b, and a second groove 14b on the bottom surface of second locating region 12b. When first keyboard portion 1a and second keyboard portion 1b are unfolded relative to each other, second locating region 12b, second rail 13b and second groove 14a are aligned with first locating region 12a, first rail 13a and first groove 14a to form an accommodation region 12, a strip-shaped rail 13 and a guiding groove 14, respectively. With the help of the strip-shaped rail 13 and the guiding groove 14, the clamping stage 2 is movably mounted on the accommodation region 12 in a lateral direction of the foldable keyboard 1.

The clamping stage 2 has a panel 21 and a contact part 22 extended downward from a front side of the panel 21 and fit with the strip-shaped rail 13. The clamping stage 2 further has a clamping part 23 on a rear side thereof and fit with the guiding groove 14. The panel 21 has a pair of bumps 24 on a rear side thereof and each bump 24 has a pivotal hole 25 on a inner side thereof such that the panel 21 can be pivotally connected to the retaining stage 3.

Figure 3:
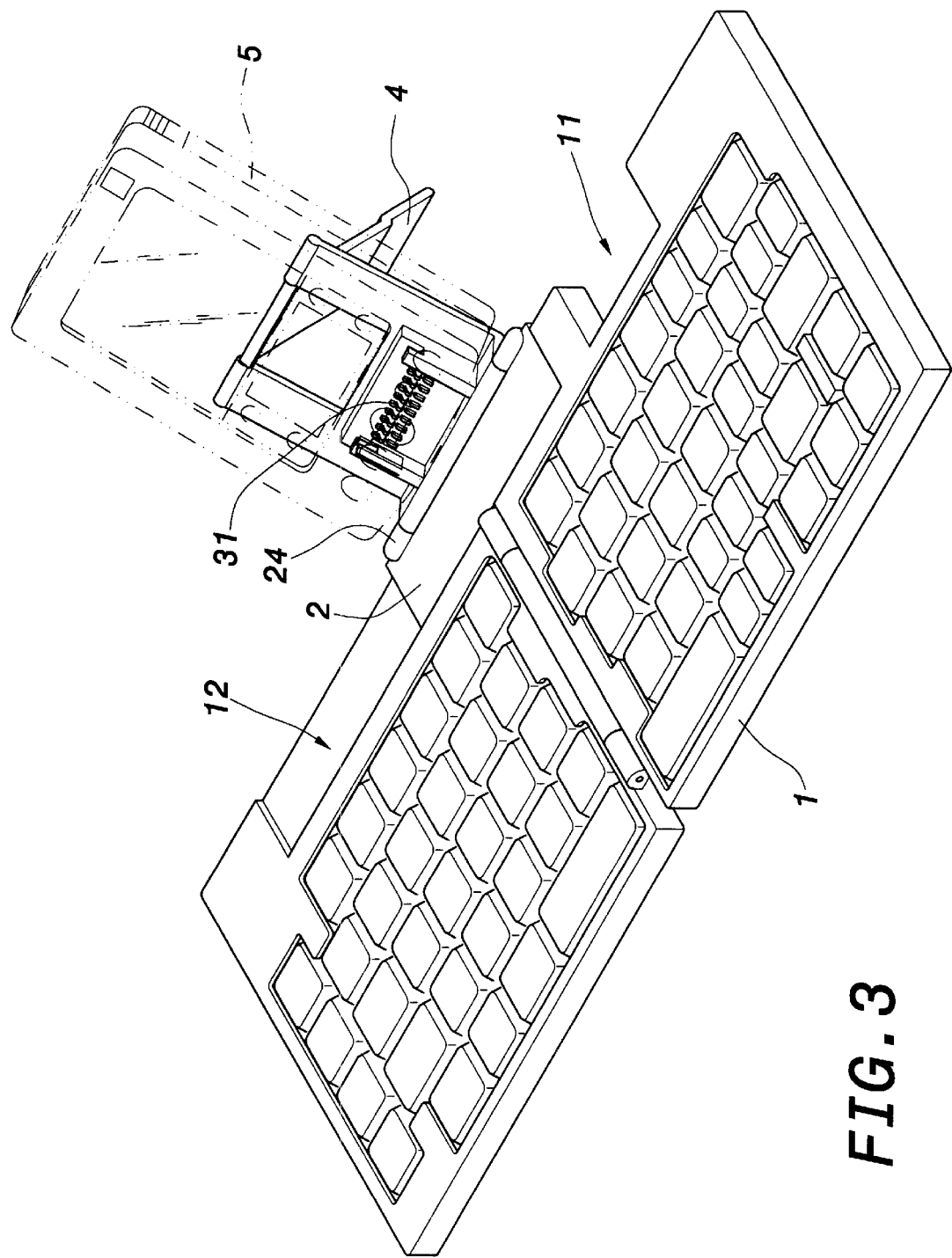
FIG. 3 shows a perspective view of the keyboard in stretched state in the present invention.

The retaining stage 3 has a socket 31 electrically connected to the internal circuit of the keyboard 1 and a portable electronic device 5 such as a mobile phone or a PDA (personal digital assistant), as shown in FIG. 3, is inserted into the socket 31. The retaining stage 3 has a front side defines a pair of pivotal posts 32 pivotally connected to the pivotal holes 25 of the clamping stage 2, whereby the retaining stage 3 is rotated with respect to the pivotal posts 32 thereof. Moreover, the retaining stage 3 has a topside defines a guiding hole 33 and two pivotal holes 34 which are respectively adjacent to two sides of said guiding hole 33.

The supporting plate 4 is plate-shape and has two pivotal shafts 41 on two front sides thereof. The two pivotal shafts 41 are pivotally connected to the two pivotal holes 34 of the retaining stage 3 such that the supporting plate 4 is rotated around the two pivotal shafts 41 on one side thereof. The supporting plate 4 stands on another side thereof to support the retaining stage 3.

Figure 4A:
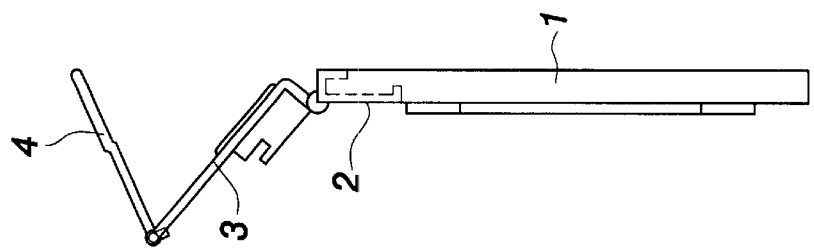
FIG. 4A shows a sectional view of the keyboard in stretched state in the present invention.
Figure 4:
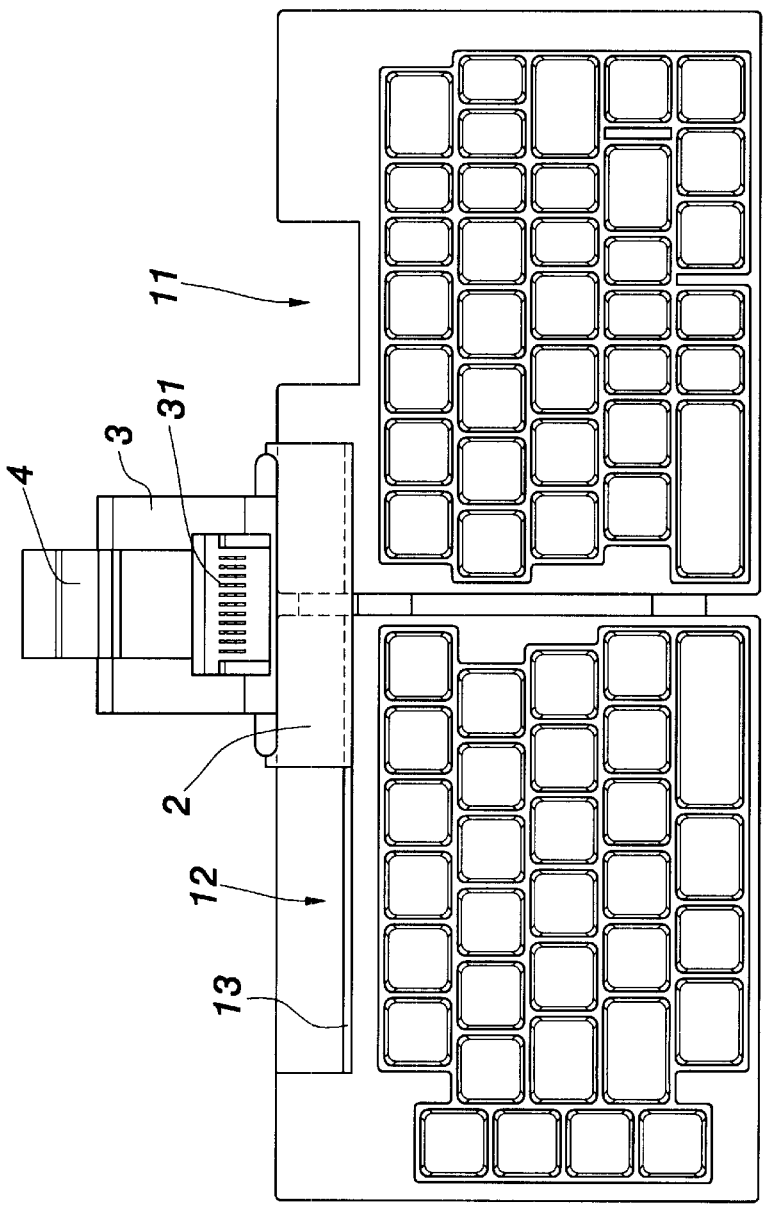
FIG. 4 shows a top view of the keyboard in stretched state in the present invention.

When the keyboard 1 is unfolded, the clamping stage 2 can be shifted laterally to a center position, as shown in FIGS. 3 to 4A, such that the keyboard 1 is fixed in an expanded state. At this time, the portable electronic device 5 is inserted to the socket 31 for operation.

Figure 5:
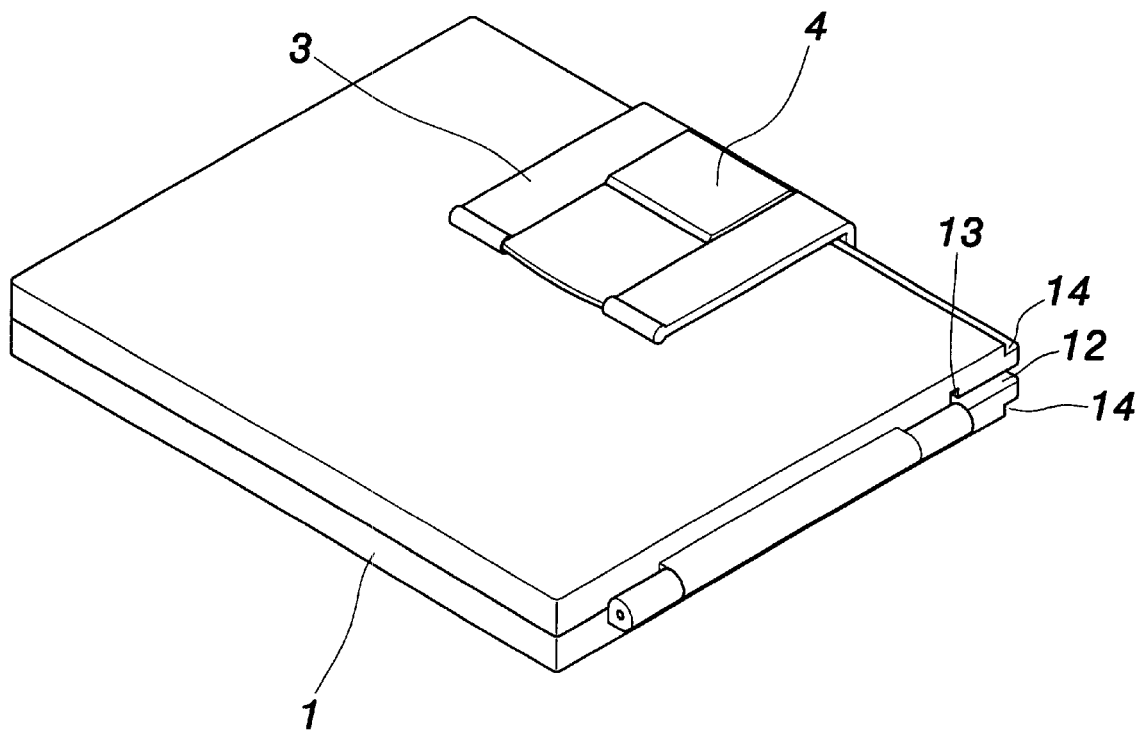
FIG. 5 shows a perspective view of the keyboard in folded state in the present invention.

With reference now to FIG. 5, when the keyboard 1 is folded, the opening 11 receives the retaining stage 3 and is covered by the supporting plate 4.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications within the scope of the invention as defined in the appended claims.

What is claimed is:

1. A foldable keyboard, comprising:

a first keyboard portion having a front edge and a rear edge, and a first locating region formed at the rear edge;

a second keyboard portion pivotably connected to the first keyboard portion so that the first key board portion is foldable relative to the second keyboard portion, and having a front edge and a rear edge, and a second locating region formed at the rear edge, the second locating region aligning with the first locating region to form an accommodation region when the first keyboard portion and the second keyboard portion are unfolded relative to each other; and a clamping stage mounted on the accommodation region at a first position when the first keyboard portion and the second keyboard portion are folded relative to each other, the clamping stage being movable to a second position when the first keyboard portion and the second keyboard portion are unfolded relative each other to prevent the first keyboard portion and the second keyboard portion from being folded relative to each other;

wherein the first keyboard portion has a rail on a top surface of the first locating region and a first groove on a bottom surface of the first locating region, the second keyboard portion has a second rail on a top surface of the second locating region and a second groove on a bottom surface of the second locating region, the first rail and the second rail are aligned to form a strip-shaped rail and the first grove and the second groove are aligned to form a guiding groove while the first keyboard portion and the second keyboard portion are unfolded relative to each other and the clamping stage has a panel, a contact part extended downward from a front side of the panel that fits with the strip-shaped rail and a clamping part on a rear side thereof that fits with the guiding groove such that the clamping stage is capable of sliding back and forth from the first position to the second position on the accommodation region.

2. The foldable keyboard as claimed in claim 1, further comprising a retaining stage having a socket for accommodating a portable electronic device.

3. The foldable keyboard as claimed in claim 2, wherein the clamping stage has a pair of bumps which define respectively a pivotal hole on an inner side thereof such that the clamping stage can be pivotally connected to the retaining stage which rotates around the pivotal hole.

4. The foldable keyboard as claimed in claim 2, wherein the retaining stage further comprises a supporting plate to support the retaining stage.

5. The foldable keyboard as claimed in claim 4, wherein the retaining stage has a topside defining a guiding hole and two pivotal holes pivotally connected to two pivotal shafts of the supporting plate, respectively.

6. The foldable keyboard as claimed in claim 2, wherein the second keyboard portion has an opening for receiving the retaining stage while the clamping stage is at the first position for the first keyboard portion and the second keyboard portion being folded relative to each other.

7. The foldable keyboard as claimed in claim 1, further comprising a retaining stage having a socket for accommodating a PDA (Personal Digital Assistant).

8. The foldable keyboard as claimed in claim 1, wherein when the clamping stage is in the second position, the clamping stage is disposed on both the first keyboard portion and the second keyboard portion, and when the clamping stage is in the first position, the clamping stage is deposed only on the first keyboard portion.

9. The foldable keyboard as claimed in claim 8, wherein the clamping stage is slidable along the respective rear edges of the first keyboard portion and the second keyboard portion when moved from the first portion to the second position.

* * * * *